United States Patent [19]
Graves

[11] 4,245,749
[45] Jan. 20, 1981

[54] SAFETY DEVICE

[75] Inventor: Charles T. Graves, Brookfield, Ohio

[73] Assignee: General American Transportation Corporation, Chicago, Ill.

[21] Appl. No.: 2,357

[22] Filed: Jan. 10, 1979

[51] Int. Cl.³ .................... B65D 25/54; F16K 17/40
[52] U.S. Cl. .................................. 220/82 A; 73/334; 116/276; 137/68 R; 137/559; 220/89 A
[58] Field of Search ............... 220/89 A, 82 R, 82 A, 220/207, 327; 137/68 R, 559; 116/276; 73/334, 330, 323, 332, 333; 222/154, 159

[56] References Cited

U.S. PATENT DOCUMENTS

| 424,188 | 3/1890 | Eareckson | 137/559 X |
|---|---|---|---|
| 1,205,443 | 11/1916 | Elkins | 220/89 A X |
| 2,123,662 | 7/1938 | Raymond | 220/89 A |
| 3,199,488 | 8/1965 | Farr | 116/276 |
| 3,310,197 | 3/1967 | Folmsbee et al. | 220/89 A |
| 3,435,984 | 4/1969 | Damiani | 220/89 A |
| 3,672,749 | 6/1972 | Roser | 116/276 X |

FOREIGN PATENT DOCUMENTS 1274782  8/1968  Fed. Rep. of Germany ............ 73/334

Primary Examiner—Allan N. Shoap
Attorney, Agent, or Firm—Vogel, Dithmar, Stotland, Stratman & Levy

[57] ABSTRACT

A safety device for a pressure vessel having an opening therein in which is positioned an upstanding base secured around the vessel opening with a frangible diaphragm covering the opening. A protective cap covers the base with the frangible diaphragm and has a central aperture therein covered by a transparent material providing continuous visibility of the frangible diaphragm. The protective cap has an internal annular seat to retain the frangible diaphragm in place and spaced apart fasteners maintain the cap fixedly connected to the base.

6 Claims, 4 Drawing Figures

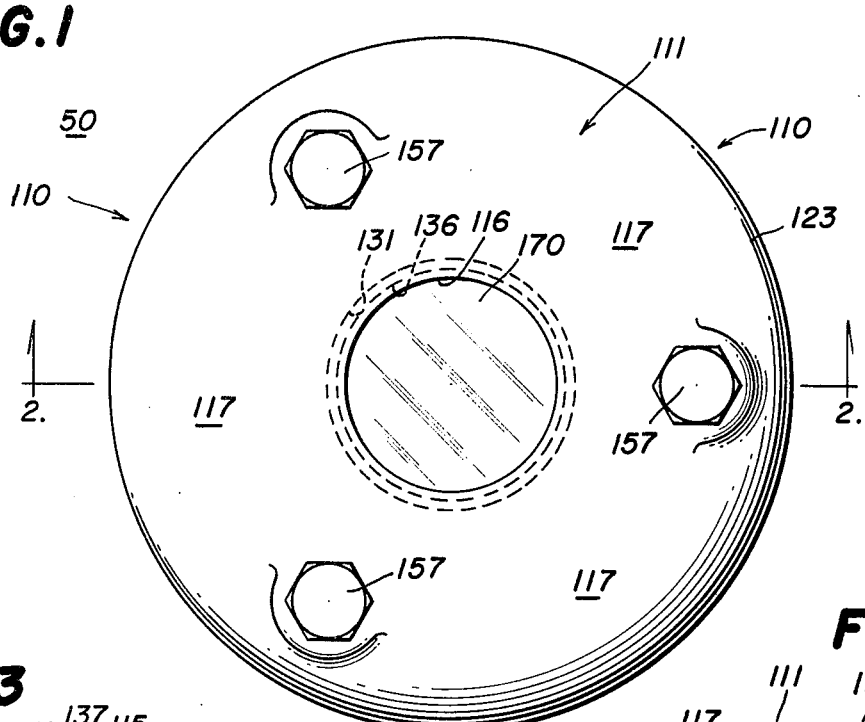
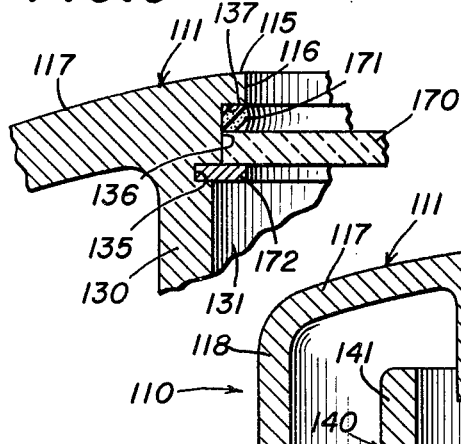
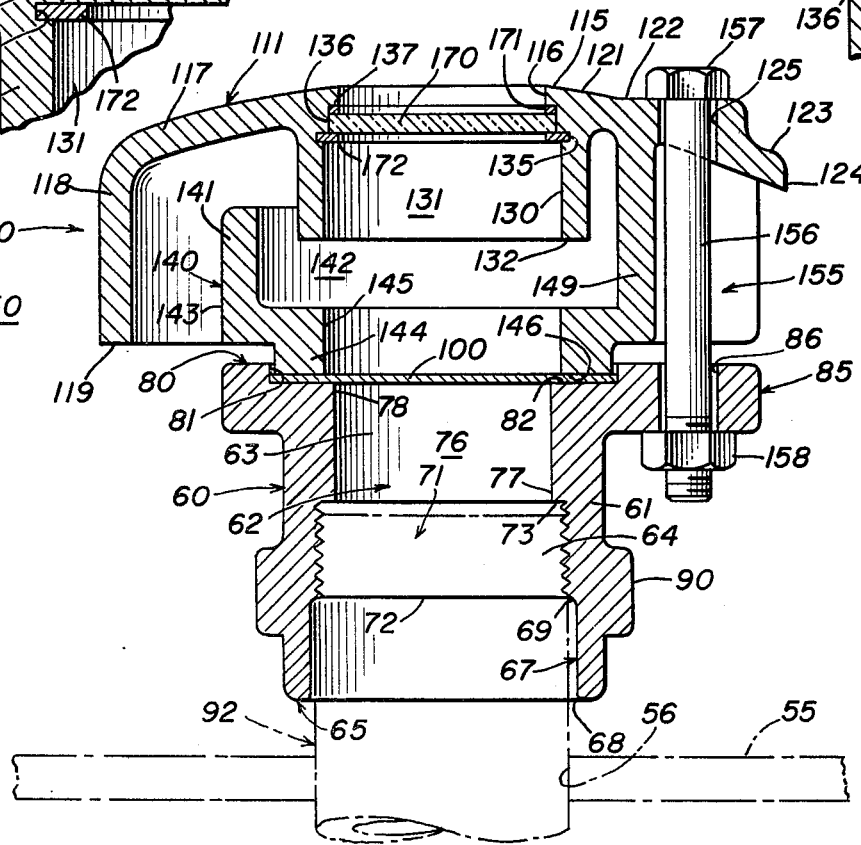

SAFETY DEVICE

BACKGROUND OF THE INVENTION AND PRIOR ART STATEMENT

This invention relates to a safety device for a pressure vessel in which a frangible member or diaphragm prevents undue pressure buildup in the vessel and is visible through a protective cap.

A safety device of the general type contemplated by this invention is a releif device adapted to be secured around an opening in a pressure vessel such as that used on railway tank cars, tank trucks, tank barges and stationary tanks in refineries and storage areas. The safety device includes an opening in the pressure vessel leading to the atmosphere which is closed by a frangible member adapted to rupture at a predetermined pressure. In prior art devices, this frangible member is hidden from view and may rupture without being readily apparent to inspection personnel.

Patents that disclose safety devices of the type contemplated by the subject invention are the Smith, et al. U.S. Pat. No. 2,536,321, the Folmsbee, et al. U.S. Pat. No. 3,310,197, the Carlson U.S. Pat. No. 3,845,878, the Fryer U.S. Pat. No. 1,157,685 and the Martin, et al U.S. Pat. No. 3,238,574.

Additional prior art patents enclosed herewith relate to sight glass assemblies providing visibility of the interior of a vessel and are illustrated by the Meginnis U.S. Pat. No. 3,625,390, the Lewis U.S. Pat. No. 1,179,441, and the Farr U.S. Pat. No. 3,199,488.

SUMMARY OF THE INVENTION

This invention relates to a safety device for a pressure vessel, and more particularly to a safety device for pressure vessel wherein a frangible diaphragm covering an aperture in the pressure vessel is continuously visible, although covered by a protective cap.

An important object of the present invention is to provide a safety device for a pressure vessel having an opening therein with an upstanding base secured around the vessel opening defining a passageway and the frangible diaphragm covering the passageway, the safety device including protective cap means having a portion thereof transparent covering the frangible diaphragm, the protective transparent portion of the cap being in registry with at least apart of the frangible diaphragm, and means detachably retaining the cap over the base, whereby the frangible diaphragm is continuously visible and protected.

Another object of the present invention is to provide a safety device for a pressure vessel having an opening therein with an upstanding base secured around the opening defining a passageway and a frangible diaphragm covering the passageway, the safety device comprising an annular retaining member in registry with the base adapted to clamp the frangible diaphragm therebetween, a protective cap over the annular retaining member having an aperture in registry with the frangible diaphragm, a transparent material covering the cap aperture providing continuous visibility through the cap to the frangible diaphragm between the retaining member and the base, and means detachably retaining the cap and the retaining member over the base, whereby the frangible diaphragm is visible and protected A still further object of the present invention is to provide a safety device of the type described wherein the annular retaining member defines a first aperture slightly larger in diameter than the base passageway and in registry therewith and the second aperture larger than the first aperture defined by an upstanding cylindrical wall integral with the cap, the cap having a dome shaped outer surface with a downwardly extended upward flange terminating near the end of the retaining member bearing against the frangible diaphragm and a downwardly extending annular flange inwardly of the peripheral flange terminating inside the upstanding cylindrical wall.

These and other objects of this invention may be more readily understood by reference to the following specifications taken in connection with the accompanying drawings, in which:

BRIEF DESCRIPTION OF THE DRAWINGS

FIG. 1 is a top plan view of the safety device of the present invention particularly illustrating the top thereof;

FIG. 2 is a view in section of the device of FIG. 1 taken along the line II—II thereof;

FIG. 3 is a fragmentary view of the protective cap illustrated in FIG. 2 particularly illustrating the means for mounting the transparent material in the cap.

FIG. 4 is an enlarged view of a segment of a second embodiment of the protective cap and means for mounting the transparent material therein.

DETAILED DESCRIPTION OF THE PREFERRED EMBODIMENT

Referring now to the drawing, there is disclosed a safety device 50 for use with a pressure vessel 55 having an aperture 56 therein. A base 60 has a one-piece cylindrical body 61 defined by a small diameter portion 63 of the cylindrical body 61, an intermediate diameter portion 64 and a large diameter portion 65. The large diameter portion 65 is formed by an internal wall section 67 of the cylindrical body 61 with a bottom end 68 and an upper internal flange surface 69. The intermediate diameter section 64 of the cylindrical body 61 is formed by the internal threaded wall section 71 having a bottom 72 integral with the upper section 69 and an upper flange portion 73. The small diameter section 63 of the cylindrical body 61 is formed by an internal wall 76 having a bottom end 77 and an upper end 78.

The base 60 has a top surface 80 provided with a circular countersink 81 having a flat seating surface 82 which has a juncture with the upper end 78 of the internal wall section 76. The base 60 is further provided with three equilaterally spaced apart first lateral extensions 85 each having an aperture 86 therethrough. A second lateral extension or wrenching surface 90 spaces below the first lateral extensions 85 extends around the entire outer periphery of the base 60 and has a downwardly extending cylindrical portion 92 which fits over a threaded pipe nipple extending upwardly from the exterior surface of the pressure vessel 55 and engaging threaded wall section 71. For brevity the threaded pipe is not illustrated.

A frangible diaphragm 100, standard in the art, is seated on the surface 82 in the circular countersink 81. The frangible diaphragm 100 is constructed of a material specifically designed to fracture or rupture at a specified pressure, thereby providing insurance that excessive pressure build up in the vessel 55 will not occur.

A protective cap 110 overlies the frangible diaphragm 100 and protects same. The protective cap 110 has a dome shaped outer shell 111 with a central flat exterior portion 115 having an aperture 116 therein. Equilaterally spaced around the periphery of the aperture 116 of the dome shaped outer shape 111 are downwardly sloping portions 117 terminating in a vertically extending flange 118 having a bottom surface 119. Intermediate each of the sections 117 are short downwardly sloping portions 121 leading into a flat horizontal portion 122 having an aperture 125 therein. Outwardly of the aperture 125 are outwardly sloping portions 123 terminating at an end 124. As seen from the drawings, portions 122 and 123 of the dome shaped outer shell 111 are intermediate each of the sections 117 and provide apertures 125 for a fasteners hereinafter to be described.

Depending downwardly and interiorly of the protective cap 110 is a cylindrical wall 130 having an inner surface 131 and a bottom end surface 132. A circular groove 135 is formed in the inner surface 131 of the cylindrical wall 130, and a cylindrical opening above the groove 135 is defined by the inner wall surface 136 which terminates in a horizontally extending bearing surface 137. A retaining member 140 includes a cylindrical wall 141 having an inner surface 142 and an outer surface 143. A central aperture 145 is provided in an outwardly extending cylindrical collar section 144 of the retaining member 140, which collar section is provided with a circular bearing surface 146 at the bottom of the collar. As seen, when the protective cap 110 is in position, the bearing surface 146 abuts the frangible diaphragm 100 and maintains it in position in the seat 82. The retaining member 140 is integral with the dome shaped outer shell 111 as evidenced by the wall of 149. Therefore, it is seen that the protective cap 110 is a one-piece construction which includes the retaining member 140.

The protective cap 110 is maintained in place on the base 60 by means of three spaced apart fastening means 155 each including a standard threaded bolt 156 having a hex head 157 and a nut 158.

Finally the protective cap 110 is provided with a transparent material or lens 170 circular in plan view positioned within the cap 110 and insulating the interior of the cap from the atmosphere. The transparent material or lens 170 is positioned within the opening defined by the wall section 136 and is maintained in place by the coaction of a gasket of resilient material 171 trapped between the transparent material 170 and the bearing surface 137 and a snap ring 172 in the circular groove 135. The protective cap 110 when mounted to the base 60 provides continuous protection to the frangible diaphragm 100 and continuous visibility of the diaphragm through the transparent material or lens 170.

Referring now to FIG. 4 of the drawing, the protective cap 110 is provided with a transparent material or lens 170 circular in plan view positioned within the cap 110 and insulating the interior of the cap from the atmosphere. The transparent material or lens 170 is positioned within the opening defined by the wall section 137 and is maintained in place by the coaction of a gasket or resilient material 171 positioned below the lens 170 and the snap ring 172 in the circular groove 135 above the lens 170. The protective cap 110 when mounted to the base 60 provides continuous protection to the frangible diaphragm 100 and continuous visibility of the diaphragm through the transparent material or lens 170. A feature of the embodiment disclosed in FIG. 4 is that the lens 170 may be loaded from the top of the protective cap 110 rather than through the bottom as previously illustrated in FIGS. 1 through 3, for convenience of inspectors in the field.

The safety device 50 of the present invention is useful for a wide variety of pressure vessels including, but not limited to, railroad tank cars, tank trucks, tank barges and stationary storage tanks in refineries and storage areas. The base 60 may be made of any art recognized material such as cast steel, ductile iron or malleable iron; similarly, the protective cap 110 may be made of the same materials. The frangible diaphragm 110 is commercially available and made of art recognized materials dependent upon the rupture pressure required by the system. The transparent material or lens 170 may be any high impact plastic such as polymethyl methacrylate or the like or may be glass. The transparent material or lens 170 should be of a sufficient strength to withstand the environment and to prevent rupture of the diaphragm 100 from outside influence. The gasket 171 can be made from natural rubber or any other suitable resilient material, attention being paid to the nature of the material in the pressure vessel 55 to prevent any chemical reaction between the gasket and the lading. Similarly, the snap ring 172 may be made of steel or other art recognized material.

The safety device 50 of the present invention is advantageous because it provides continuing visibility of the frangible diaphragm 100 irrespective of the condition thereof while at the same time providing secure protection to the diaphragm. Prior art devices either provided no visibility to the diaphragm 100 or were hinged or the like which required lifting a cap in order to see the diaphragm. This is disadvantageous because the diaphragm may fracture and not be noticed or alternatively the latching mechanism retaining the cap in the closed position may fail resulting in exposure of the frangible diaphragm to the outside environment.

The present invention overcomes the disadvantages of the prior art by providing continuing visibility of the diaphragm 100 while at the same time providing secure protection thereto. An additional feature of the present invention is the construction of the protective cap 110 which provides an annular area between the retaining member 140 and the downwardly depending flange 118. In the event that the frangible disc 100 ruptures, escape of lading under pressure from the vessel 155 will be directed downwardly by the dome shaped outer shell 111 of the cap thereby preventing injury to personnel inspecting the diaphragm 100.

While there has been described what at present as considered to be the preferred embodiment of the present invention, it will be understood that various modifications may be made therein without departing from the true spirit and scope of the present invention. Some of these modifications inlcude substituting glass or other transparent material for the disclosed polymethyl methacrylate. Additionally, the transparent material or lens 170 could be mounted in the protective cap 110 by means of set screws or the like.

It will be seen therefore that there has been provided a safety device 50 including a protective cap 110 which accomplishes all the objects of the present invention and particularly provides continuing visibility of the frangible diaphragm irrespective of the condition of the diaphragm while at the same time protecting the frangible diaphragm from the outside environment. There has been described what at present is considered to be the preferred embodiment of the present invention but various modifications and alterations, as referred to above, may be made therein without altering the true spirit and scope of the present invention and it is intended to cover in the following claims all such alterations and modifications.

What is claimed is:

1. A safety device for a pressure vessel having an opening therein with an upstanding base secured around the opening defining a passageway and a frangible diaphragm covering the passageway, said safety device comprising an annular retaining member in registry with the base adapted to clamp the frangible diaphragm therebetween, a protective cap over said annular retaining member having an aperture in registry with the frangible diaphragm, said annular retaining member defining a first aperture slightly larger in diameter than the base passageway and in registry therewith and a second aperture larger than said first aperture defined by an upstanding cylindrical wall integral with said cap, said cap having a dome-shaped outer surface with a downwardly extending peripheral flange terminating near the end of said retaining member bearing against the frangible diaphragm and a downwardly extending annular flange inwardly of said peripheral flange terminating inside said upstanding cylindrical wall, a transparent material covering said cap aperture providing continuous visibility through said cap to the frangible diaphragm between said retaining member and the base, the wall of said cap defining said cap aperture having a portion thereof smaller in diameter than said cap aperture defining a flange and an annular groove spaced from said flange, a resilient gasket positioned against said flange bearing against the surface of said transparent material closest to the frangible diaphragm, a retaining ring in said groove bearing against the other surface of said transparent material maintaining said material in place, and means detachably retaining said cap and said retaining member over the base, whereby the frangible diaphragm is continuously visible and protected.

2. The safety device of claim 1, wherein said transparent portion of said cap is centrally located and circular in plan view.

3. The safety device of claim 1, wherein said transparent portion of said cap is a synthetic organic resin.

4. The safety device of claim 1, wherein said transparent portion of said cap is a polymethyl methacrylate.

5. The safety device of claim 1, wherein the base has portions thereof extending laterally of the passageway axis in registry with portions of said protective cap.

6. The safety device of claim 5, wherein said detachable retaining means includes three bolts and nuts equilaterally spaced around said cap, said bolts extending through said cap and through the laterally extending portions of the base.

* * * * *